2,811,496

VINYL HALIDE RESINS PLASTICIZED WITH 1-SUBSTITUTED-4-CARBOALKOXY-2-PYRROLIDINONE

Charles J. Knuth, Flushing, N. Y., assignor to Chas. Pfizer & Co., Inc., Brooklyn, N. Y., a corporation of Delaware No Drawing. Application June 21, 1955, Serial No. 517,082

3 Claims. (Cl. 260—30.2)

This invention relates to a group of plastic compositions. In particular these compositions comprise a vinyl resin elastomer and an alkyl ester of a 1-substituted-4-carboxy-2-pyrrolidinone as a plasticizer.

This application is a continuation-in-part of my copending application, Serial No. 206,512, filed January 17, 1951, now abandoned. In that application the products disclosed as useful plasticizers for vinyl resin elastomers were described as mono-ester, organic-substituted mono-amides of itaconic acid. It has now been found that these novel compounds have the structure shown below.

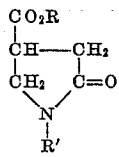

wherein R is a $C_1$ to $C_8$ alkyl group and R' is an alkyl, aryl, or aralykyl group. These compounds are prepared by heating an itaconic acid di-ester with about an equimolar proportion of a primary amine. In the preparation of these valuable compounds use of a larger proportion of amine, say two molecular equivalents, results in the formation of the corresponding 1-substituted-4-carboxamido-2-pyrrolidinone in predominant amount. Less than one mole of amine to one mole of ester may be used, in which cases the product will still contain some unreacted ester. Therefore, it is advisable to carefully control the ratio of the reactants so that these valuable esters are obtained in maximum yield and purity. Other methods for preparing these compounds are described hereinafter. Still others will occur to those skilled in the art.

The reaction is usually carried out by mixing the itaconic ester and the primary amine and heating the mixture at or near the reflux temperature. This temperature is limited by the boiling point of the most volatile component either reactant or reaction product. For example, when butylamine, B. P. 78° C., is used with the di-octyl ester, the temperature is limited by the boiling point of the amine. In cases where the lower itaconic esters such as the methyl, ethyl or propyl esters are used with the long chain amines such as octyl amine, it is sometimes convenient to distill off the volatile alcohol, i. e. methanol, ethanol, or propanol, as it is formed as a by-product in order to force the reaction to completion at a more rapid rate. If the amine and ester reactants are not naturally miscible, it is convenient to use an organic solvent system.

By using various combinations of amines and di-esters, it is possible to obtain a wide variety of plasticizers of the type disclosed herein. For example, when a given di-ester, e. g., the dibutyl or dioctyl ester was used with a variety of primary amines, a series of compounds of the foregoing structure was obtained having the same R group with different R' groups. Amines that were found to be useful include straight or branched chain alkyl amines such as methylamine, ethylamine, propylamine, butylamine, hexylamine, and octylamine; alicyclic amines such as cyclohexylamine, aryl amines such as aniline, toluidine, and naphthylamine and aralkyl amines such as benzylamine and phenethylamine. With the lower boiling amines such as methylamine and ethylamine it is convenient to carry the reaction out in a pressure vessel or sealed tube. Conversely, use of a single amine with a variety of di-esters yielded a series wherein R' was the same and the R groups were varied. Various itaconic di-esters have been employed including the dimethyl, dibutyl, dihexyl, and di-octyl esters. It is also useful in some instances to convert one ester into another of a higher boiling alcohol by transesterification. For example, 1-octyl-4-carbohexoxy-2-pyrrolidinone may be prepared by heating 1-octyl-4-carbomethoxy-2-pyrrolidinone with hexanol in the presence of a small amount of sodium methoxide and distilling the methanol out of the reaction vessel as it is formed. Alternatively the original methyl ester, or other ester, may be hydrolyzed by heating at about 90–100° with aqueous alkali followed by recovery of the free acid and re-esterification with the desired alcohol.

Various other methods, of course, may be used to prepare these novel compounds. For example, itaconic acid may be heated with a primary amine to yield a 1-substituted-4-carboxy-2-pyrrolidinone which is then converted to its esters by methods well known in the art.

It is thought that the formation of the plasticizers used herein from primary amines and itaconic di-esters takes place by a stepwise process. First the amine adds to the carbon-carbon double bond of the di-ester to form a secondary amino di-ester. The amino function of this intermediate is then so situated in the molecule that the relatively strainless five-membered pyrrolidinone ring may form by intra-molecular reaction of the amine function with the appropriate ester function. This interpretation is helpful in designing syntheses for these valuable plasticizing compounds. For example, treatment of itaconic anhydride with a primary amine yields an itaconic half-acid amide. However, this material fails to cyclize on heating to yield a 1-alkyl-4-carboxy-2-pyrrolidinone intermediate since the amido group is too weakly basic to cyclize by intramolecular addition to the double bond of the itaconic acid element. Thus, the itaconic acid element must be introduced via an intermediate such as itaconic acid or an ester thereof with which the amide forming reaction is less facile than the addition reaction.

1-substituted-4-carboalkoxy-2-pyrrolidinones are indistinguishable from the simple uncyclized monoamide monoesters of itaconic acid on the basis of their compositions alone. Thus it was necessary to assign the above structure to these unique and valuable compounds on the basis of other evidence. These materials as obtained above were found to be devoid of carbon-carbon unsaturation as evidenced by their failure to react with potassium permanganate and by their failure to absorb hydrogen in the presence of a platinum oxide catalyst. Uncyclized monoamide monoesters contain such an unsaturated linkage. The —NH— function which one would expect to be present if these materials were simple amides was found to be absent. Thus these compounds did not show the presence of an active hydrogen atom with lithium aluminum hydride and the characteristic —NH— infrared absorption in the 2.86 to 3.03 micron region is absent. Positive controls were obtained in carrying out the above tests with N-octyl itaconic half acid amide prepared from octylamine and itaconic anhydride.

1-substituted-4-carboalkoxy-2-pyrrolidinones are generally stable, high boiling liquids and are particularly useful as plasticizers with vinyl resins, that is resins such as polyvinyl chloride and vinyl chloride-vinyl acetate copolymers. Plastic compositions of this nature preferably comprise the resin and the new plasticizer in the relative proportions of about 50 to 90% resin and 10 to 50% plasticizer. Particularly valuable for such uses are the compounds of this invention represented by the foregoing structural formula wherein R and R' together contain about twelve carbon atoms.

The following examples are given by way of illustration and are not to be considered as limiting the invention in any way. In fact, many apparently widely different embodiments of this invention may be made without departing from the spirit and scope thereof. It is to be understood that the above invention is limited only as defined in the appended claims. In the following examples temperatures are given in degree centigrade and pressures in millimeters of mercury.

EXAMPLE I

Equimolar portions of the dibutyl itaconate (B. P. 190°/60 mm., $n_D^{25}$ 1.4415, $d_4^{20}$ 0.99) and n-octylamine were mixed at room temperature. Heat was evolved which carried the internal temperature to 68° C. When the reaction had subsided the mixture was heated at 105–115° for four hours. At the conclusion of the period of heating the butanol which had been produced during the reaction was evaporated at reduced pressure and the residue distilled in vacuo. The straw colored product 1-octyl-4-carbobutoxy-2-pyrrolidinone, was collected boiling over a short range centering at 200° C./3 mm. $n_D^{29}$ 1.4638 in 81% yield.

Analysis calcd. for $C_{17}H_{31}NO_3$: C, 68.65; H, 10.51; N, 4.71. Found: C, 68.54; H, 10.39; N, 4.73.

A small quantity of dark residue remained in the distillation flask at the completion of distillation. It solidified on cooling and was recrystallized from acetone to yield a white crystalline solid, melting point 70–72°. After repeated recrystallization the melting point was raised to 75–78°. This material was found to have the composition of N-octyl 1-octyl-4-carboxamido-2-pyrrolidinone.

Analysis calcd. for $C_{21}H_{40}N_2O_2$: C, 71.54; H, 11.44; N, 7.95. Found: C, 71.66; H, 11.46; N, 8.16.

EXAMPLE II

A series of 1-substituted-4-carboalkoxy-2-pyrrolidinones was prepared by variations of the procedure described above. The reaction temperatures ranged between 30 and 175° C. The products were recovered as above by vacuum evaporation of volatile constituents from the reaction mixture followed by distillation in vacuo. Yields of the order of 90% were obtained in most cases. The boiling points and other physical properties of these materials and that of the product of Example I are listed in the following table.

*1-substituted-4-carboalkoxy-2-pyrrolidinones*

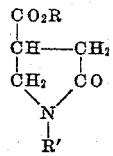

| R | R' | Boiling Point, °C. (mm. Pressure) | Refractive Index (25° C. Sodium D line) | Specific Gravity | Solubility in Water at 25° C. |
|---|---|---|---|---|---|
| methyl | isopropyl | 145–95 (10) | | | |
| methyl | butyl | 210 (10) | | | |
| methyl | amyl | 155–90 (7) | | | |
| methyl | octyl | 175–85 (4) | | | |
| butyl | isoamyl | 160–70 (5) | | | |
| butyl | octyl | 200 (3) | 1.4638 (29°) | 0.985 | <0.0002% |
| butyl | phenyl | 189–195 (1) | 1.5181 | 1.11 | <0.0002% |
| hexyl | octyl | | 1.4590 | 0.966 | <0.0002% |
| octyl | butyl | 192–210 (2) | 1.4611 | 0.976 | <0.0002% |
| octyl | amyl | | 1.4633 | 0.971 | <0.0002% |
| octyl | octyl | | 1.4643 | 0.958 | <0.0002% |

EXAMPLE III

A group of plastic compositions of this invention was prepared using the compounds of Example II as plasticizers. They were compounded with a vinyl chloride-vinyl acetate copolymer powder in the proportion of 40% by weight of the new ester-pyrrolidinone as plasticizer and 60% of the resin. This resin was a commercially available material known as VYNW Vinylite. The elastomers were prepared by conventional means on a 2-roll rubber mill heated to about 150° C., and were then subjected to a number of standard tests commonly used to valuate such materials. Their properties were compared with those of a control, treated in the same manner but using dioctyl phthalate as the plasticizer.

*Properties of the plastic compositions*

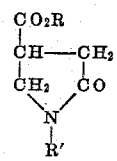

| Plasticizer | | Stress[1] at 100% elong. (p. s. i.) | Tensile[1] Strength (p. s. i.) | Elong.[1] at break point (percent) | Shore 5[2] second Hardness Test |
|---|---|---|---|---|---|
| R | R' | | | | |
| methyl | butyl | 1,615 | 2,750 | 255 | 77 |
| methyl | amyl | 750 | 1,575 | 305 | 66 |
| methyl | octyl | 600 | 1,685 | 375 | 62 |
| butyl | amyl | 575 | 1,620 | 345 | 62 |
| butyl | octyl | 445 | 1,675 | 405 | 61 |
| butyl | phenyl | 1,365 | 2,710 | 315 | 74 |
| hexyl | octyl | 740 | 1,855 | 335 | 62 |
| octyl | butyl | 650 | 1,700 | 350 | 61 |
| octyl | amyl | 650 | 1,715 | 340 | 62 |
| octyl | octyl | 850 | 1,910 | 305 | 64 |
| dioctyl phthalate (control) | | 930 | 2,190 | 310 | 66 |

[1] ASTM D412-41.
[2] ASTM D676-46T.

EXAMPLE IV

The remarkably efficient plasticizing action of 1-octyl-4-carbobutyoxy-2-pyrrolidinone and 1-butyl-4-carbo-octoxy-2-pyrrolidinone in resins was further tested at various plasticizer concentrations varying between 30% and 40%. The data obtained for these elastomers using VYNW Vinylite as the resin component is tabulated below.

*Properties of plastic compositions at various plasticizer concentrations*

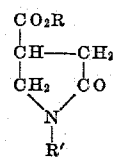

| Plasticizer | | Plasticizer Concentrations | Stress [1] at 100% elong. (p. s. i.) | Tensile [1] Strength (p. s. i.) | Elong. [1] at break point (percent) | Shore 5 [2] second Hardness |
|---|---|---|---|---|---|---|
| R | R' | | | | | |
| butyl | octyl | 30 | 2,130 | 2,920 | 200 | 76 |
| | | 35 | 950 | 2,450 | 280 | 69 |
| | | 40 | 445 | 1,675 | 405 | 61 |
| octyl | butyl | 30 | 1,860 | 2,930 | 260 | 78 |
| | | 35 | 960 | 2,220 | 310 | 71 |
| | | 40 | 650 | 1,700 | 350 | 61 |
| dioctyl phthalate (control) | | 30 | 2,130 | 3,160 | 240 | 90 |
| | | 33.3 | 1,650 | 2,860 | 270 | 81 |
| | | 37 | 1,230 | 2,500 | 300 | 72 |
| | | 40 | 930 | 2,190 | 310 | 66 |
| | | 45 | 610 | 1,700 | 320 | -------- |

[1] ASTM D 412-41.
[2] ASTM D 676-46T.

The valuable compositions of this invention may be used in the preparation of molding compounds, extruded and calendered articles, cloth coatings, lacquers, etc. Other ingredients for specific purposes may also be incorporated in these plastic compositions, for example, additional plasticizers, solvents, non-solvent diluents, pigments, fillers, stabilizers, and lubricants may be used.

What is claimed is:

1. A plastic composition comprising a vinyl halide resin and a compound having the structure

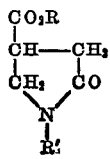

wherein R is a $C_1$ to $C_8$ alkyl group and R' is selected from the group consisting of an alkyl group, an aryl group and an aralkyl group, the compound constituting from about 10 to about 50% by weight of the composition.

2. A plastic composition as claimed in claim 1 wherein R and R' together contain about twelve carbon atoms.

3. A plastic composition as claimed in claim 1 wherein the vinyl resin is a vinyl chloride resin.

References Cited in the file of this patent
UNITED STATES PATENTS
2,295,600    Natelson et al. _____ Sept. 15, 1942